UNITED STATES PATENT OFFICE.

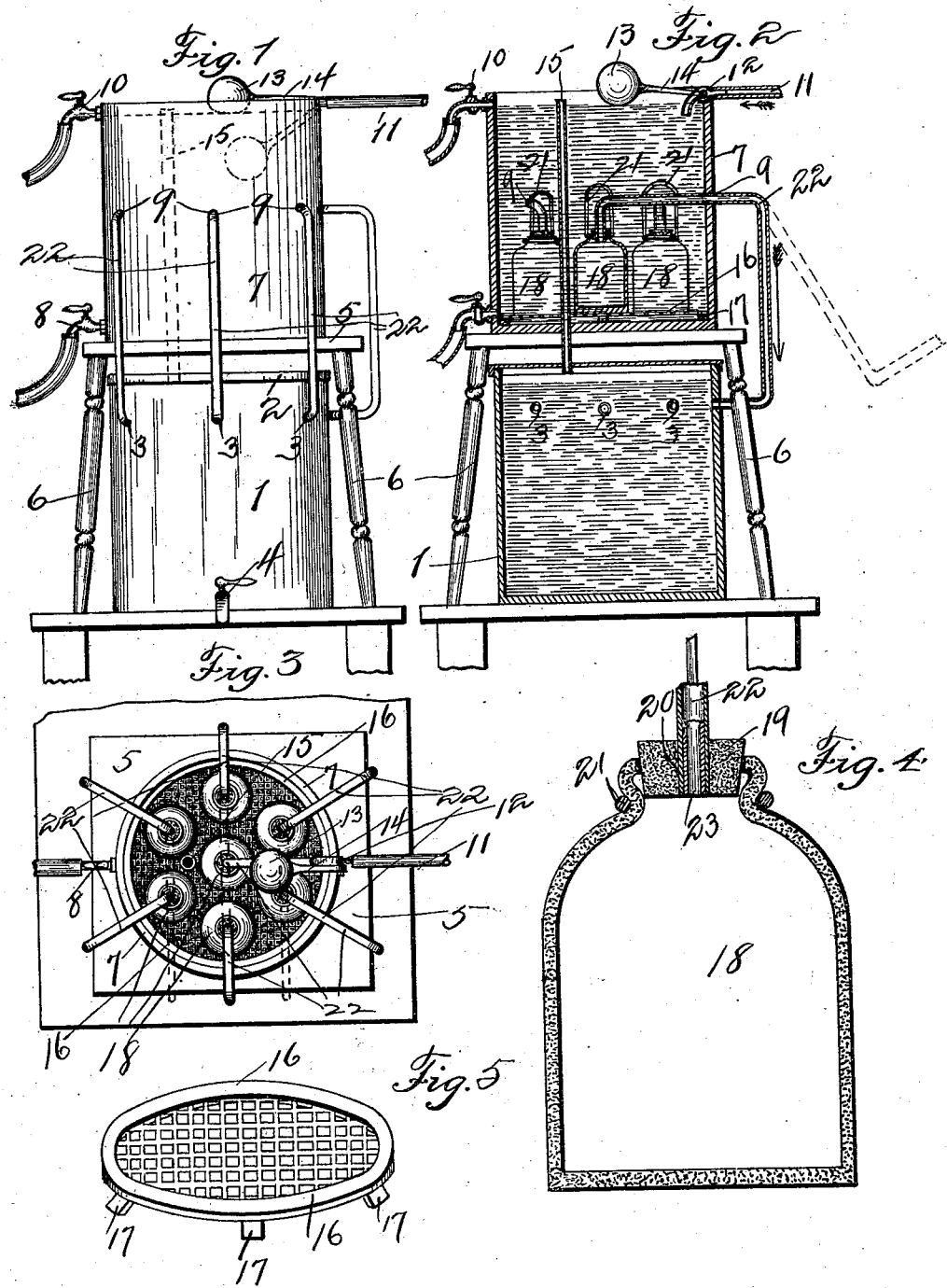

VALENTINE OSTER, OF ST. LOUIS, MISSOURI, ASSIGNOR TO JOHN MUTTING AND JAMES T. JUDD, OF SAME PLACE.

FILTER.

SPECIFICATION forming part of Letters Patent No. 549,609, dated November 12, 1895.

Application filed October 29, 1894. Serial No. 527,199. (No model.)

*To all whom it may concern:*

Be it known that I, VALENTINE OSTER, of the city of St. Louis, State of Missouri, have invented certain new and useful Improvements in Filters, of which the following is a full, clear, and exact description, reference being had to the accompanying drawings, forming a part hereof.

My invention relates to a filter, the object of my invention being to construct a filter that will occupy a comparatively small space and yet be capable of filtering a much greater quantity of water than do the much larger filters that are now in common use.

A further object of my invention is to construct a filter that requires no attention whatever during its operation, and which is capable of being quickly and easily cleansed.

My invention consists in certain novel features of construction, combination, and arrangement of parts, hereinafter described and claimed.

Referring to the drawings, Figure 1 is a side elevation of a filter constructed in accordance with my invention. Fig. 2 is a vertical central sectional view of said filter. Fig. 3 is a top plan view of my improved filter. Fig. 4 is a vertical sectional view of one of the filtering-jugs, of which I make use in carrying out my invention. Fig. 5 is a view in perspective of a rack I place in the bottom of the unfiltered-water jar and upon which the filtering-jugs are positioned.

The filtered-water receptacle 1 is preferably an ordinary stone jar provided with a sheet-metal cover 2 and with a plurality of apertures 3 at equal distances apart around and near the upper edge of the receptacle 1. A suitable outlet 4, such as a faucet or stop-cock, is located at a point near the base of the receptacle 1. This receptacle 1 is preferably located upon a table or some supporting-frame, and immediately above said receptacle is a platform 5, mounted upon ordinary supporting-legs 6. Positioned upon this platform 5 is the unfiltered-water receptacle 7, which is preferably an ordinary stone jar and of the same size as is the filtered-water receptacle 1. Located at a point near the base of this unfiltered-water receptacle 7 is an outlet 8, the same preferably being a faucet or stop-cock.

Midway between the top and bottom of the unfiltered-water receptacle 7 and arranged equidistant from each other around the periphery of said receptacle is a series of apertures 9 in every way similar to the aperture 3 in the filtered-water receptacle.

Located near the top edge of the unfiltered-water receptacle 7 is an overflow pipe or faucet 10. Directly opposite this overflow-faucet is an inlet-pipe 11, which is provided with an ordinary automatic cut-off valve 12, that is operated by a float 13, that is fixed to an arm 14, which arm is fixed to the cut-off valve 12. An air-pipe 15 extends from the interior of the filtered-water receptacle 1 to a point near the top of the unfiltered-water receptacle 7.

Adapted to be located in the bottom of the unfiltered-water receptacle is a rack 16, the same being provided with downwardly-pending legs or feet 17, thus raising said rack a slight distance from the bottom of the unfiltered-water receptacle. Located within the receptacle 7 and upon the rack 16 is a series of filtering-jugs 18, that are constructed of any suitable filtering material. These jugs 18 are provided with suitable corks or stoppers 19, that are provided with centrally-arranged vertical apertures 20. These jugs 18 have secured to their necks bails 21, thus providing means for lifting said jugs out of the unfiltered-water receptacle.

Flexible tubes 22, preferably of rubber, have inserted in one end short metallic tubes 23. The ends of the flexible tubes thus provided with metallic tubes are inserted in the vertical apertures 20 in the corks or stoppers of the filtering-jugs 18. By this construction a perfectly water-tight joint is made between the ends of the flexible tubes and the apertures in the corks or stoppers. From the jugs 18 the flexible tubes 22 are passed outwardly through the apertures 9 in the unfiltered-water receptacle 7, from thence downward, and their free ends inserted in the apertures 3 in the filtered-water receptacle 1.

The operation of my improved filter is as follows: The various parts being in the position as shown in Fig. 2 and the faucets 4 and 8 closed and the faucet 10 open, unfiltered water enters the unfiltered-water receptacle 7 through the pipe 11 and valve 12. When the water in this receptacle has reached a point near the top of said receptacle, the float 13 will be raised thereby and the valve 12 closed thereby, shutting off the supply of unfiltered water. Should, however, the automatic cut-off valve and float fail to operate, the water would pass off through the overflow-faucet 10, located near the top of the unfiltered-water receptacle. The unfiltered water in the receptacle now percolates through the numerous filtering-jugs 18, located within said receptacle, and in doing so said water becomes thoroughly cleansed and purified and as near chemically pure as possible. When the thus filtered water fills the jugs 18, it passes out through the flexible tubes 22, which act as siphons, and through them is discharged into the filtered-water receptacle 1, which is, as before described, located immediately beneath the unfiltered-water receptacle. From this receptacle 1 the filtered water may be drawn off as desired through the outlet or faucet 4, located near the bottom of said receptacle 1. The inlet-openings of the tubes or siphons 22 being located a considerable distance below the normal water-line in the unfiltered-water receptacle, said tubes act as automatic or self-starting siphons.

To clean the filtering-jars and the interior of the unfiltered-water receptacle 7, the faucet 8 is opened and the water allowed to run freely from the supply-pipe 11 through said receptacle. As the rack 16 is raised a slight distance from the bottom of the receptacle 7, the heavier particles of sediment and impurities will be located beneath said rack, and as the water flows through the receptacle 7 this sediment and impurities will be entirely washed out. As the filtering-jugs 18 are raised a slight distance from the bottom of the receptacle 7, the sediment and impurities will in no way interfere with the free filtering of water through the bottom portions of the jugs 18.

To clean the jugs 18 the flexible tubes 22 are removed from the apertures 3 near the top edge of the receptacle 1 and air forced or blown through said tubes and into the jugs 18. The air thus forced into the latter will pass outward through the material and dislodge all the impurities and sediment that may have lodged upon or in the material forming said jugs. To further clean said jugs they may be removed from the receptacle 7 and their exteriors washed with a brush or in any suitable manner.

Thus it will be seen how I have constructed a device that will filter out all vegetable, earthy, and insoluble matter, purifying the water and rendering the same as near chemically pure as possible.

The jugs 18 are preferably made of fine porous potters' clay baked in an ordinary potters' kiln. A filter constructed in accordance with my invention is capable of filtering a much greater quantity of impure water than can the larger and more complicated filters now in common use.

I claim—

The improved filter, comprising a filtered-water receptacle 1 having an annular series of apertures 3 in its vertical walls, a suitable outlet for the said filtered-water receptacle, the unfiltered water receptacle 7 supported above said filtered-water receptacle and provided in its vertical walls at a point some distance below the normal water line, with a series of apertures 9, each of which is located in a plane directly above a corresponding one of the said apertures 3 of the said unfiltered water receptacle, a series of filtering jugs supported adjacent the bottom of the said unfiltered water receptacle, and a series of flexible tubes 22 the lower ends of which are located in the said apertures 3 of the filtered water receptacle, and the bodies of which extend outward and thence upward in vertical lines and pass through the apertures 9 of the said unfiltered-water receptacle, and have their ends secured to the said filtering-jugs at a point beneath the plane of the said apertures 9, substantially as herein specified.

In testimony whereof I affix my signature in presence of two witnesses.

VALENTINE OSTER.

Witnesses:
M. G. IRION,
JNO. C. HIGDON.